United States Patent
Roussel

(10) Patent No.: US 7,823,701 B2
(45) Date of Patent: Nov. 2, 2010

(54) LIGHT MONITORING DEVICE FOR AN ELEVATOR SYSTEM

(75) Inventor: Frank Roussel, Muralto (CH)

(73) Assignee: Inventio AG, Hergiswil NW (CH)

( * ) Notice: Subject to any disclaimer, the term of this patent is extended or adjusted under 35 U.S.C. 154(b) by 486 days.

(21) Appl. No.: 11/739,328

(22) Filed: Apr. 24, 2007

(65) Prior Publication Data

US 2007/0246305 A1 Oct. 25, 2007

(30) Foreign Application Priority Data

Apr. 24, 2006 (EP) .................................. 06113010

(51) Int. Cl.
*B66B 1/34* (2006.01)
(52) U.S. Cl. ...................... 187/392; 187/316
(58) Field of Classification Search ................. 187/247, 187/391–394, 396, 313, 316, 317
See application file for complete search history.

(56) References Cited

U.S. PATENT DOCUMENTS

| | | | | |
|---|---|---|---|---|
| 4,520,343 A * | 5/1985 | Koh et al. | ................... | 187/391 |
| 4,555,724 A * | 11/1985 | Enriquez | ..................... | 348/61 |
| 5,001,557 A | 3/1991 | Begle | | |
| 5,258,586 A | 11/1993 | Suzuki et al. | | |
| 5,298,697 A | 3/1994 | Suzuki et al. | | |
| 5,387,768 A | 2/1995 | Izard et al. | | |
| 6,161,654 A * | 12/2000 | Sirigu et al. | ................ | 187/391 |
| 6,339,375 B1 * | 1/2002 | Hirata et al. | ................ | 340/541 |
| 6,386,325 B1 * | 5/2002 | Fujita | ......................... | 187/316 |

FOREIGN PATENT DOCUMENTS

| | | |
|---|---|---|
| DE | 3038195 A1 | 5/1981 |
| DE | 19522760 A1 | 4/1997 |
| EP | 0534714 A2 | 3/1993 |
| EP | 0902402 A | 3/1999 |
| EP | 1345444 A1 | 9/2003 |
| FR | 2829755 A1 | 3/2003 |
| WO | WO 0142120 A | 6/2001 |

* cited by examiner

*Primary Examiner*—Jonathan Salata
(74) *Attorney, Agent, or Firm*—Fraser Clemens Martin & Miller LLC; William J. Clemens

(57) ABSTRACT

The present invention relates to a monitoring device for a elevator system, including an optical sensor unit, which receives light emitted by a external light source existing in the vicinity of the elevator system and which transforms the light into contrast information and an evaluation unit, which evaluates the contrast information in order to monitor the elevator system. The present invention relates further to a method for monitoring a elevator system, including the steps of receiving light emitted by a external light source existing in the vicinity of the elevator system, transforming the light into contrast information, evaluation of the contrast information in order to monitor the elevator system, recognizing a situation of the elevator system and triggering of a reaction adapted to the situation.

20 Claims, 2 Drawing Sheets

LIGHT MONITORING DEVICE FOR AN ELEVATOR SYSTEM

FIELD OF THE INVENTION

The present invention relates to a monitoring device for an elevator system comprising an optical sensor unit and an evaluation unit. The optical sensor unit receives and transforms light into light information in order to monitor the elevator system. Furthermore, the present invention relates to a method for monitoring the elevator system.

BACKGROUND OF THE INVENTION

A system for monitoring an elevator door is shown in EP 1 345 444 A1, which comprises a three-dimensional semiconductor sensor and a processing device. The three-dimensional semiconductor sensor includes a light source radiating light in a specific range, wherein the light source is preferably a laser diode. The light emitted by the light source is reflected by the elevator door. A sensor group mounted in the region of the elevator door receives the light reflected by the elevator door. Further, the processing unit converts the light information into three-dimensional image information, subsequently compares the image information with a reference image or several stored referenced images and recognizes changes. In the case of a recognized change the processing unit triggers a reaction adapted to the situation.

Three-dimensional semiconductor sensors enabling three-dimensional detection of image information are complicated and costly. Moreover, in order to obtain sufficient light information for evaluating a three-dimensional image information a separate light source, which provides a high light intensity, is necessary. Further, the light source must be positioned and aligned in such a way, that the light emitted by the light source is reflected in an appropriate manner. As a further disadvantage a high amount of information needs to be analyzed and evaluated by the evaluation unit. Thus, an external microprocessor is necessary to provide a high data processing power.

SUMMARY OF THE INVENTION

It is an object of the present invention to provide a monitoring device for an elevator system which needs less light information and can be used also for other purposes than the monitoring of the elevator door. It is a further object of the present invention to provide also a method for monitoring an elevator system.

According to the present invention a monitoring device for an elevator system comprises an optical sensor unit and an evaluation unit. The optical sensor unit receives light emitted by an external light source in the vicinity of the elevator system and transforms the light into contrast information and filters out the information. The evaluation unit evaluates the filtered contrast information in order to monitor the elevator system by means of the contrast information.

In comparison to the known system described in EP 1 345 444 A1 the monitoring device according to the present invention does not require an extra light source within the housing of a sensor unit. It is sufficient to use the light emitted by a foreign light source, e.g. the landing light, the car light or even the car emergency light.

The data information used for monitoring the elevator system is based on the filtered contrast of the light, i.e. a sub-set of two-dimensional information. Hence, less data processing power is necessary to process the light information received by the sensor unit. As such, part of the evaluation can be integrated in the sensor unit. Preferably, the chip of the sensor unit includes the evaluation unit. In other words, the algorithm for evaluating the contrast information is implemented at least partly on the sensor chip itself and only minimal further processing is necessary. Only one chip need be used.

According to the present invention the light information detected does not constitute a full image, but only a subset of an image gradient, gradient orientation or gradient evaluation. For example, the sensor chip outputs only most significant contrast gradients as image features and so part of the contrast analysis is made on the sensor chip.

In one preferred embodiment of the present invention the evaluation unit is partly integrated in the sensor unit, particularly on the chip of the sensor unit.

In another preferred embodiment of the present invention the sensor unit is positioned and aligned to monitor an elevator floor lobby of the elevator system. If a person approaches the elevator floor lobby and enters a predetermined area monitored by the sensor unit, the evaluation unit recognizes a change of the contrast information and generates a signal, which is transmitted to a control unit of the elevator system. Preferably, the sensor unit is disposed on or adjacent to the door frame of the car door or of the shaft door.

In another preferred embodiment, the sensor unit is positioned and aligned to monitor an interior space of a car of the elevator. For this purpose the sensor unit can be disposed at the ceiling of the car.

According to a further embodiment the sensor unit is positioned and aligned to monitor the presence of a person or an object in the car. Thus, it is also possible to count the number of people and/or objects entering or leaving the car. Also a detection of specific objects such as beds is possible.

In a further embodiment the car comprises a destination call unit, wherein the sensor unit is positioned and aligned to monitor an actuation of the destination call unit. Preferably, the destination call unit comprises several switch buttons, which designate the different floors. The contrast information detected by the sensor unit enables the evaluation unit to recognize which button has been pressed by the user. Hence, only a virtual car operation panel is necessary, e.g. a drawing of the buttons on the wall of the car.

According to a further embodiment, the sensor unit monitors the position of the car door or the shaft door.

As an external light source the light emitted from a car light, a landing light or a car emergency light can be used. Such light sources already exist in common elevator systems or buildings and provide light of sufficient intensity for obtaining contrast information of the light. No extra light source adapted to the optical sensor is necessary.

According to the present invention a method for monitoring an elevator system comprises the following steps: a) receiving light emitted by an external light source existing in the vicinity of the elevator system, b) transforming the light into contrast information, c) filtering and evaluating the contrast information, d) recognizing a situation of the elevator system by means of the filtered and evaluated contrast information and e) triggering of a reaction adapted to the situation.

In a preferred embodiment of the method according to the present invention at least one of the following situations is recognisable: a) position of the elevator door or shaft door; b) actuation of the destination call unit; c) presence of a person or object in the vicinity of the elevator; d) presence of a person or object in the car; or e) number of persons or objects in the car.

Further, at least the steps of transforming and evaluation are performed at least partly on the chip of a sensor unit for receiving the light.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
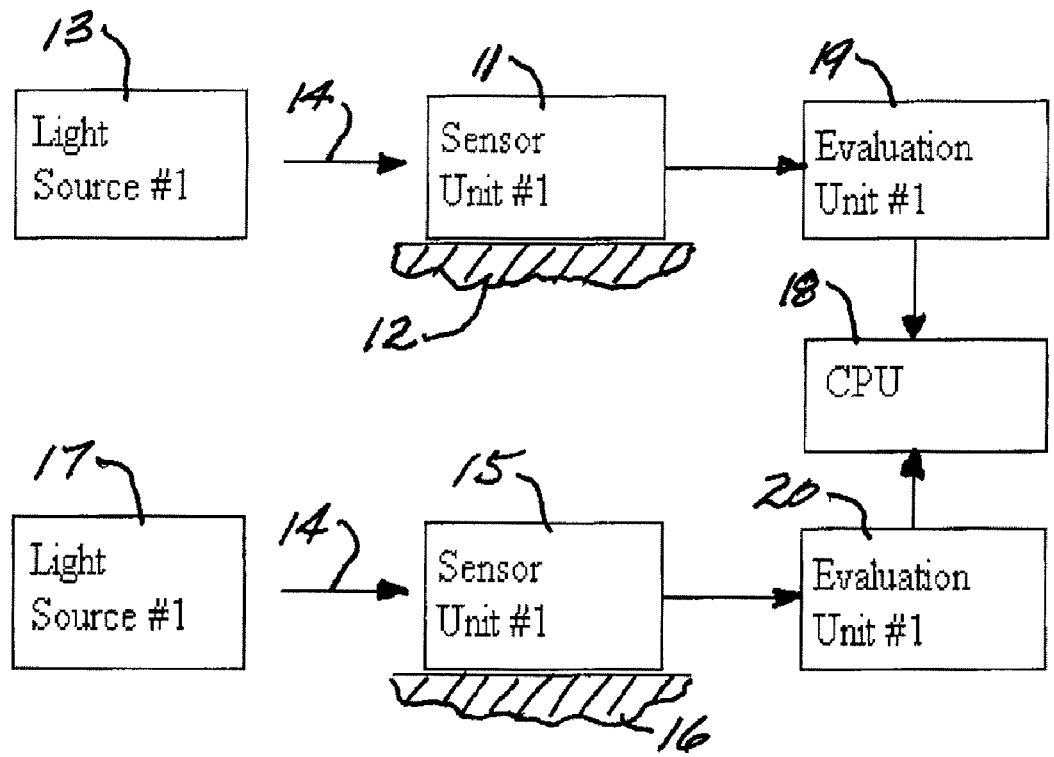
FIG. 1 is a block diagram of the monitoring device according to the present invention.

According to the following example a preferred embodiment of the monitoring device and monitoring method according to the present invention is described:

An elevator system of a building comprises a plurality of elevators for transporting passengers. As shown in FIG. 1, at each floor of the building a first sensor unit 11 is positioned in the vicinity of each elevator door frame 12 to monitor a predetermined area in front of the elevator doors. Close to the first sensor unit 11 a landing light 13 is disposed and emits light 14, which can be received by the first sensor unit.

Each car of the elevators comprises a second sensor unit 15 mounted on the ceiling 16 (or other suitable interior surface) of the car in order to monitor a "virtual" destination call unit of the car having several "virtual" switches, i.e. representations of the buttons on the wall of the car. A light source 17 mounted on the ceiling of the car illuminates the interior space of the car. This ceiling light 17 is used as the external light source for the second sensor unit 15.

After a person has entered the monitored area of the elevator floor lobby, a change of the contrast information obtained via the light emitted from the landing light is recognized by the first sensor unit 11. Subsequently, a signal is transmitted to a central processing unit CPU 18 of the elevator system allowing the detection of the presence of a person. After arrival of a car in the floor and if the person is still recognisable within the monitored area, the elevator door is opened and the person can enter the car. Now the user raises his arm and approaches it in direction to a certain button in order to deliver a destination call. During this virtual actuation of a button the second sensor unit 15 recognizes a change of the contrast information caused by the arm or the hand of the person. Dependent on the contrast information, for example the gradient orientation, the second sensor unit 15 can recognize which one of the buttons has been pressed and transmits a signal to the CPU 18 to serve the destination call.

Figure 3:
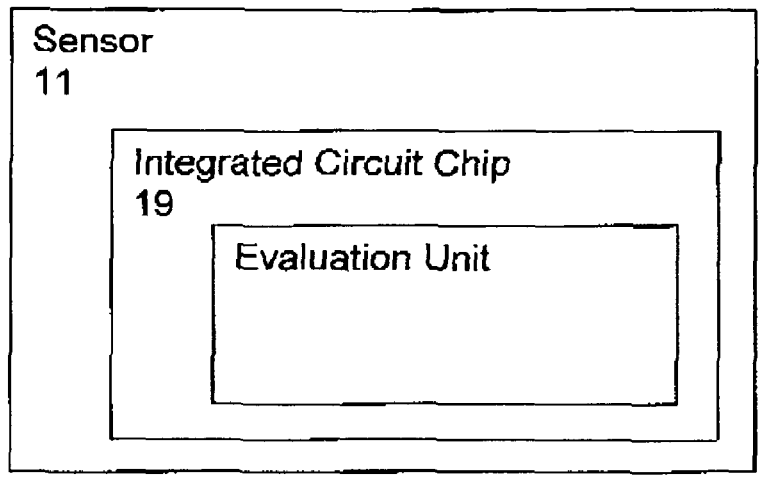
FIG. 3 is a block diagram of the integrated sensor and evaluation unit shown in FIG. 1.

Both the first and second sensor unit 11, 15 use an external light source 13, 17 for receiving sufficient light in order to obtain the contrast information. A sole integrated circuit chip 19, 20 of each sensor unit takes over the step of evaluating the contrast information. The sensor chip 19, 20 both transforms the received light into contrast information and evaluates the contrast information. In others words the evaluation unit is integrated in the sensor unit 11, 15, i.e. each optical sensor unit serves simultaneously as the evaluation unit as shown in FIG. 3.

Figure 2:
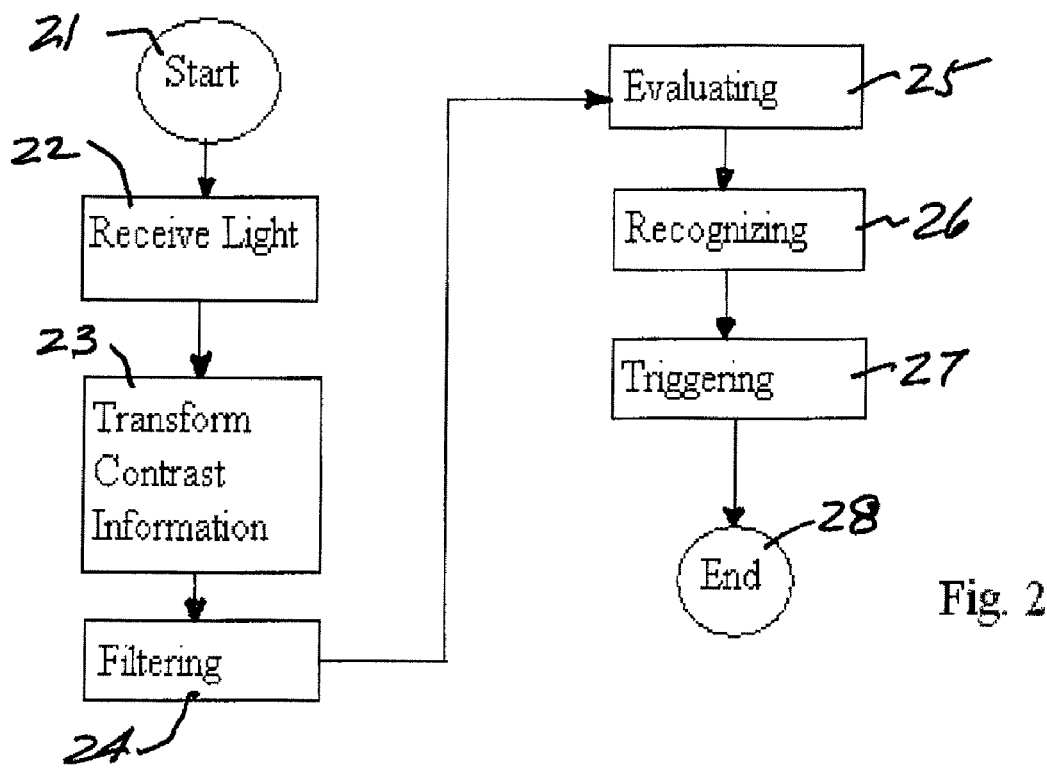
FIG. 2 is a flow diagram of the method according to the present invention.

FIG. 2 is a flow diagram of the method of monitoring an elevator system according to the present invention. The method begins at Start 21 whereupon in a step 22 the sensor 11, 15 receives the light 14 emitted by the external light source 13, 17 existing in the vicinity of the elevator system. In a step 23, the light is transformed into contrast information. The contrast information is filtered in a step 24 and evaluated in a step 25. The evaluation unit 19, 20, recognizes a situation of the elevator system by means of the filtered and evaluated contrast information in a step 26 and, in a step 27, triggers a reaction adapted to the situation. The method terminates at End 28.

In a preferred embodiment of the method according to the present invention at least one of the following situations is recognizable in the step 26: a) position of the elevator door or shaft door; b) actuation of the destination call unit; c) presence of a person or object in the vicinity of the elevator; d) presence of a person or object in the car; or e) number of persons or objects in the car.

Figure 4:
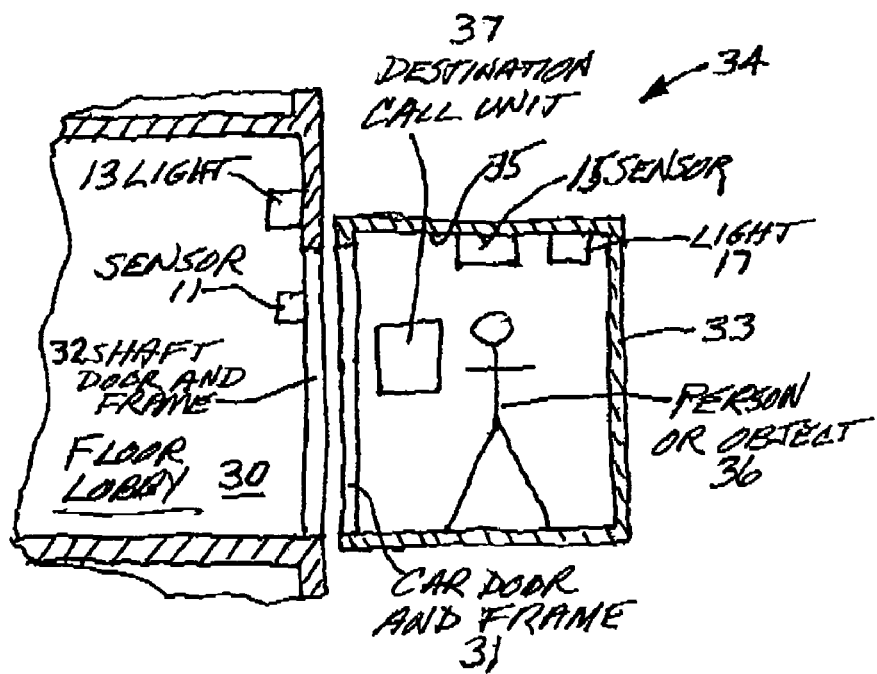
FIG. 4 is a schematic cross-sectional view of an elevator system including the monitoring device shown in FIG. 1.

As shown in FIG. 4, the sensor unit 11 is positioned and aligned to monitor an elevator floor lobby 30. The sensor unit 11 is disposed on or adjacent to a door frame of a car door 31 or a shaft door 32. The sensor unit 15 is positioned and aligned to monitor an interior space of a car 33 of the elevator system 34. The sensor unit 15 is disposed at ceiling 35 of the car 33. The sensor unit 15 is positioned and aligned to monitor a presence of a person 36 or an object in the car 33. The car 33 includes a destination call unit 37 and the sensor unit 15 is positioned and aligned to monitor an actuation of the destination call unit. The sensor units 11 and 15 monitor a position of the car door 31 or the shaft door 32 of the elevator system 34. The external light source is one of a car light 17, a landing light 13 and a car emergency light 17.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A monitoring device for an elevator system, comprising:
   an optical sensor which receives light emitted by an external light source existing in a vicinity of the elevator system and which transforms the light into contrast information; and
   an evaluation unit, which evaluates the contrast information for monitoring the elevator system by means of the contrast information, and wherein said evaluation unit is at least partly integrated in said optical sensor,
   wherein said optical sensor includes an integrated circuit chip and said evaluation unit is programmed in said chip.

2. The device according to claim 1 wherein said optical sensor is positioned and aligned to monitor an elevator floor lobby.

3. The device according to claim 1 wherein said optical sensor is disposed on or adjacent to a door frame of a car door or a shaft door.

4. The device according to claim 1 wherein said optical sensor is positioned and aligned to monitor an interior space of a car of the elevator system, and wherein said optical sensor is positioned and aligned to monitor a presence of a person or an object in the car.

5. The device according to claim 4 wherein said optical sensor is disposed at ceiling of the car.

6. The device according to claim 4 wherein the car includes a destination call unit and said optical sensor is positioned and aligned to monitor an actuation of the destination call unit.

7. The device according to claim 1 wherein said optical sensor monitors a position of a car door or a shaft door of the elevator system.

8. The device according to claim 1 wherein the external light source is one of a car light, a landing light and a car emergency light.

9. A method for monitoring an elevator system, comprising the steps of:

provoding a monitoring device for an elevator system, comprising an optical sensor which receives light emitted by an external light source existing in a vicinity of the elevator system and which transforms the light into contrast information, and an evaluation unit, which evaluates the contrast information for monitoring the elevator system by means of the contrast information, and wherein said evaluation unit is at least partly integrated in said optical sensor, wherein said optical sensor includes an integrated circuit chip and said evaluation unit is programmed in said chip;

receiving light emitted by an external light source existing in a vicinity of the elevator system;

transforming the light into contrast information;

filtering and evaluating the contrast information;

recognizing a situation of the elevator system from the filtered contrast information; and triggering of a reaction adapted to the situation.

10. The method according to claim 9 wherein said step of recognizing the situation of the elevator system from the filtered contrast information is performed by recognizing at least one of:

position of an elevator door or a shaft door;

actuation of a destination call unit;

presence of a person or object in a vicinity of the elevator;

presence of a person or object in the vicinity of the elevator doors;

presence of a person or object in the car; and number of persons or objects in the car.

11. The method according to claim 9 wherein said steps of filtering and evaluating the contrast information and recognizing a situation of the elevator system from the filtered contrast information are performed completely on a chip of an optical sensor for receiving the light in said step receiving light emitted by an external light source.

12. The method according to claim 9 including using a car light, a landing light or a car emergency light as the external light source.

13. The device according to claim 1 wherein the contrast information does not constitute a full image, and is a subset of one of an image gradient, a gradient orientation, and a gradient evaluation.

14. The method according to claim 10 wherein said step of recognizing the situation of the elevator system from the filtered contrast information is performed by recognizing the position of the elevator door or the shaft door.

15. The method according to claim 10 wherein said step of recognizing the situation of the elevator system from the filtered contrast information is performed by recognizing the actuation of the destination call unit.

16. The method according to claim 10 wherein said step of recognizing the situation of the elevator system from the filtered contrast information is performed by recognizing the presence of the person or object in the vicinity of the elevator.

17. The method according to claim 10 wherein said step of recognizing the situation of the elevator system from the filtered contrast information is performed by recognizing the presence of the person or object in the vicinity of the elevator doors.

18. The method according to claim 10 wherein said step of recognizing the situation of the elevator system from the filtered contrast information is performed by recognizing a position of an elevator door or a shaft door.

19. The method according to claim 10 wherein said step of recognizing the situation of the elevator system from the filtered contrast information is performed by recognizing the presence of a person or object in the car.

20. The method according to claim 10 wherein said step of recognizing the situation of the elevator system from the filtered contrast information is performed by recognizing the number of persons or objects in the car.

* * * * *